D. J. NORMOYLE.
TAP WRENCH.
APPLICATION FILED JULY 6, 1911.
1,041,858.
Patented Oct. 22, 1912.
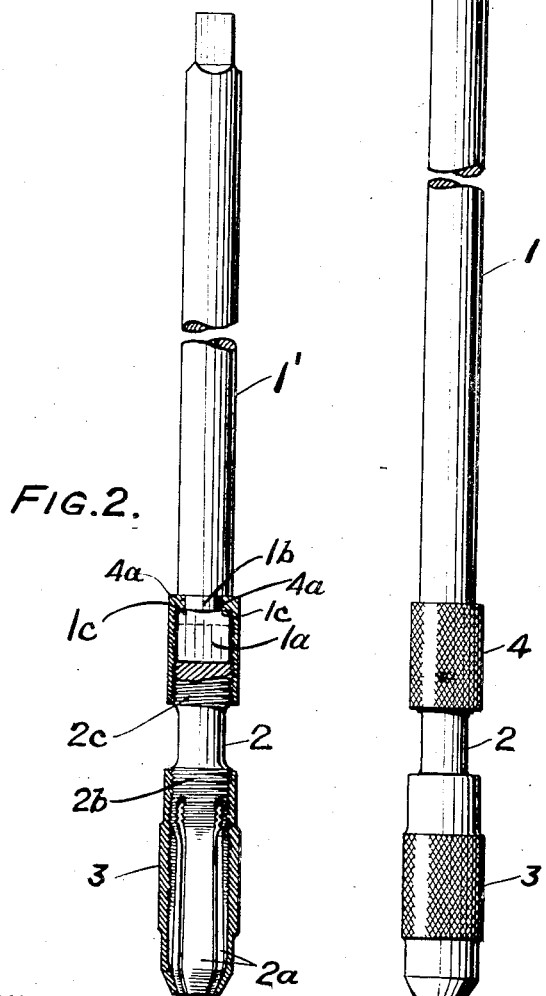
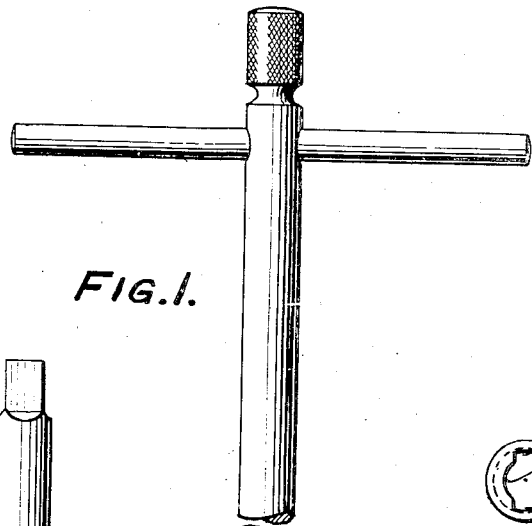
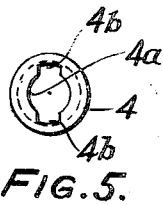
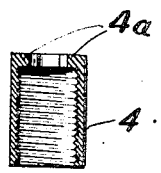
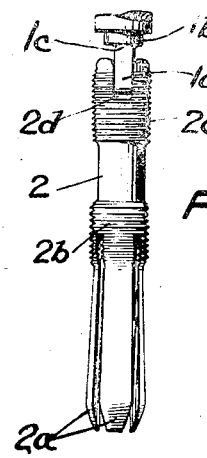
WITNESSES:
INVENTOR
Daniel J. Normoyle.
BY
ATTORNEY.

UNITED STATES PATENT OFFICE.

DANIEL J. NORMOYLE, OF PHILADELPHIA, PENNSYLVANIA.

TAP-WRENCH.

1,041,858.  Specification of Letters Patent. Patented Oct. 22, 1912.

Application filed July 6, 1911. Serial No. 637,173.

*To all whom it may concern:*

Be it known that I, DANIEL J. NORMOYLE, a citizen of the United States, residing in the city of Philadelphia, county of Philadelphia, and State of Pennsylvania, have invented certain Improvements in Tap-Wrenches, of which the following is a specification.

My invention relates to wrenches used for operating taps in places difficult of access or out of the way where handles of various lengths are required and my leading object is to provide means of superior character for connecting the tap with various handles of simple and inexpensive construction.

In the accompanying drawings, Figure 1 is an elevation of a tool comprising a handle (shown broken) coupled to a chuck in accordance with my invention; Fig. 2 is an elevation showing a second form of handle coupled to the chuck which is represented in section transverse to its position in Fig. 1; Fig. 3 is an elevation of the body of the chuck with an end of the handle set in the recessed top thereof; Fig. 4 is a longitudinal section of the sleeve for coupling the chuck to the handle, and Fig. 5 is a top plan view of this sleeve.

The tool, as illustrated in the drawings, comprises a handle 1 or 1' having an end thereof flattened to form the tongue 1$^a$ and a section thereof reduced to form the neck 1$^b$. The chuck 2, having the usual jaws 2$^a$ adapted for engaging a tap and the threaded section 2$^b$ adapted for engaging the sleeve 3 which closes the jaws, is provided with a threaded shank 2$^c$ split at its top by the groove or recess 2$^d$ adapted for receiving the tongue 1$^a$.

A sleeve 4 is adapted to screw on the threaded shank or section 2$^c$ and is provided at its top with the inwardly projecting circular flanges 4$^a$ which permit the tongue 1$^a$ to be passed between them, into the recess 2$^d$, when the sleeve is on the shank and the spaces 4$^b$ of the sleeve, between the ends of the flanges, are in registration with the recess 2$^d$. The tongue 1$^a$ having been inserted, it is locked in place by screwing down the sleeve 4 until the flanges 4$^a$, which fit and turn on the reduced part 1$^b$, engage the shoulders 1$^c$ of the tongue.

This construction permits interchangeable handles to be readily applied to the same chuck, by simple and efficient means; and, further, it permits an economical use of materials of a character adapted for the functions to be performed, the handles 1 and 1' being suitably made from ordinary rods of low grade steel, the chuck body 2 of high grade tool steel properly tempered, and the sleeves 3 and 4 of machinery steel, case hardened.

Advantages of this construction will be appreciated by understanding that to tap holes in out of the way places, in castings and the like, it is customary for workmen to make special devices useful only for the particular job and made at considerable expense of time and materials, whereas the present invention provides a chuck adapted to be connected to any one of a set of handles of inexpensive construction and length suitable to any usual work.

Having described my invention, I claim:

A tool comprising a chuck having a threaded shank having a transverse groove in the top thereof, a rod having a flattened end adapted to be engaged in said groove so that said chuck can be turned thereby, said rod having a reduced section forming a notch back of said rod end, and a sleeve provided with a thread engaging the thread of said shank, said sleeve having an elongated aperture through which said flattened end can be passed into said groove and a flange adapted to be engaged in said notch by turning said sleeve.

In witness whereof I have hereunto set my name this 3rd day of July, 1911, in the presence of the subscribing witnesses.

DANIEL J. NORMOYLE.

Witnesses:
 Jos. G. DENNY, Jr.,
 CHARLES N. BUTLER.